(12) United States Patent
Zerkle

(10) Patent No.: US 6,212,788 B1
(45) Date of Patent: Apr. 10, 2001

(54) TAPE MEASURE SYSTEM WITH PRIMARY AND SECONDARY LOCKING ASSEMBLIES

(76) Inventor: Robert Zerkle, 3517 Glenburn Ct., New Port Richey, FL (US) 34655

( * ) Notice: Subject to any disclaimer, the term of this patent is extended or adjusted under 35 U.S.C. 154(b) by 0 days.

(21) Appl. No.: 09/271,786

(22) Filed: Mar. 18, 1999

(51) Int. Cl.[7] .................................................. G01B 3/10
(52) U.S. Cl. .............................................. 33/767; 33/768
(58) Field of Search .......................... 33/758, 760, 761, 33/767, 768, 769, 770

(56) References Cited

U.S. PATENT DOCUMENTS

| | | | |
|---|---|---|---|
| 2,347,273 | * | 4/1944 | Lyle ........................................ 33/768 |
| 2,807,886 | * | 10/1957 | Aciego ................................... 33/761 |
| 3,357,106 | * | 12/1967 | Schneider ............................... 33/761 |
| 5,020,235 | * | 6/1991 | Martin ..................................... 33/768 |
| 5,809,662 | * | 9/1998 | Skinner ................................... 33/770 |
| 6,047,481 | * | 4/2000 | Bond ....................................... 33/758 |

* cited by examiner

*Primary Examiner*—G. Bradley Bennett

(57) ABSTRACT

A tape measure system with primary and secondary locking assemblies. A housing has a first face and a second face with a peripheral wall therebetween. A slot is provided in at least one linear extent on the peripheral wall. A length of flexible, essentially inextensible tape, is adapted to be rolled up in a spool-like configuration within the housing. The tape is formed of a flexible material with an arcuate cross-sectional configuration and has a central axis of rotation extending perpendicularly through central extents of the first and second faces, an interior end and a free exterior end extending through the slot to exterior of the housing, and a generally rigid stopper to preclude the exterior end of the tape from entering the housing. A locking assembly includes a first component operatively coupled with respect to the linear extent of the housing and a second component positionable in spaced operative proximity to the fixed component for the positioning of a portion of the tape therebetween. A connecting member couples at least one edge of the second component and one adjacent edge of the second component for allowing the frictional securing of a portion of the tape between the components.

5 Claims, 2 Drawing Sheets

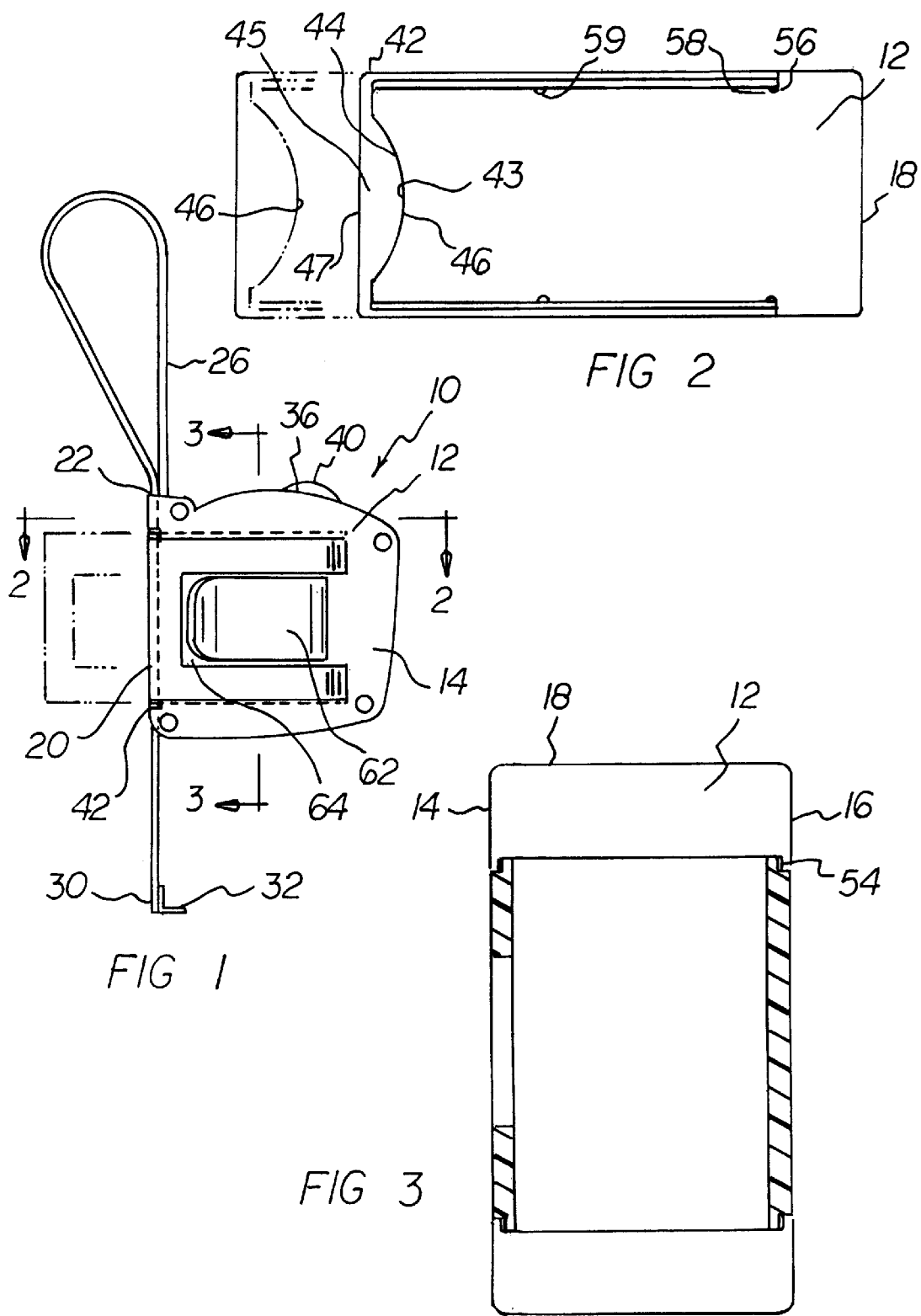

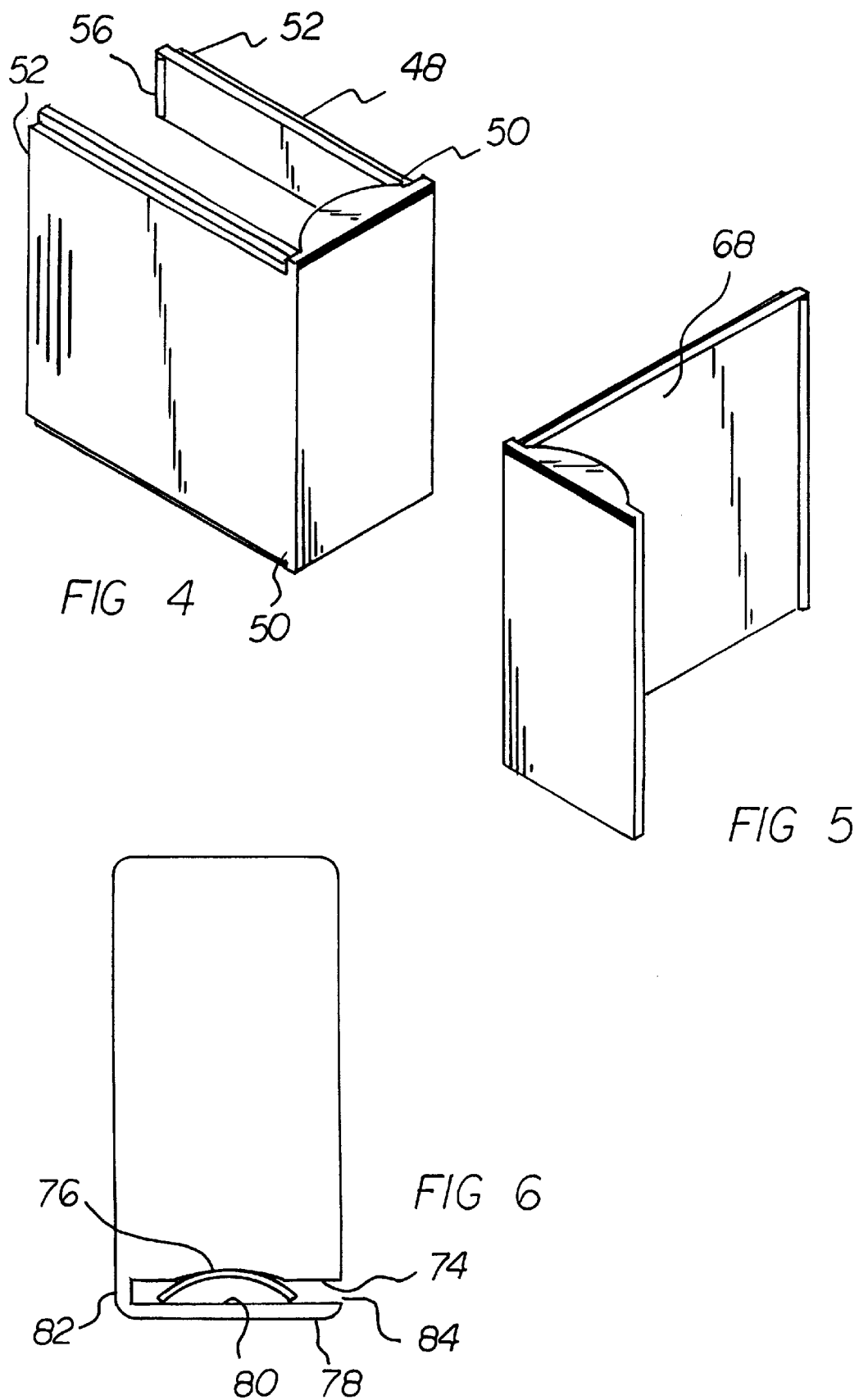

TAPE MEASURE SYSTEM WITH PRIMARY AND SECONDARY LOCKING ASSEMBLIES

BACKGROUND OF THE INVENTION

1. Field of the Invention

The present invention relates to a tape measure system with primary and secondary locking assemblies and more particularly pertains to facilitating the convenient and accurate use of a tape measure system when measuring, particularly heights.

2. Description of the Prior Art

The use of tape measures of known designs and configurations is known in the prior art. More specifically, tape measures of known designs and configurations heretofore devised and utilized for the purpose of facilitating the convenient and accurate measuring of objects through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,367,785 to Benarroch discloses a locking and measure device. U.S. Pat. No. 5,606,803 to O'Sullivan discloses a tape measure and fixture. Lastly, U.S. Pat. No. 5,782,007 to Harris discloses a tool guiding tape measure.

While these devices fulfill their respective, particular objectives and requirements, the aforementioned patents do not describe a tape measure system with primary and secondary locking assemblies that allows facilitating the convenient and accurate use of a tape measure system when measuring, particularly heights.

In this respect, the tape measure system with primary and secondary locking assemblies according to the present invention substantially departs from the conventional concepts and designs of the prior art, and in doing so provides an apparatus primarily developed for the purpose of facilitating the convenient and accurate use of a tape measure system when measuring, particularly heights.

Therefore, it can be appreciated that there exists a continuing need for a new and improved tape measure system with primary and secondary locking assemblies which can be used for facilitating the convenient and accurate use of a tape measure system when measuring, particularly heights. In this regard, the present invention substantially fulfills this need.

SUMMARY OF THE INVENTION

In view of the foregoing disadvantages inherent in the known types of tape measures of known designs and configurations now present in the prior art, the present invention provides an improved tape measure system with primary and secondary locking assemblies. As such, the general purpose of the present invention, which will be described subsequently in greater detail, is to provide a new and improved tape measure system with primary and secondary locking assemblies and method which has all the advantages of the prior art and none of the disadvantages.

To attain this, the present invention essentially comprises a plurality of components. Such components in their broadest context include a housing, a length of flexible, essentially inextensible tape, and a locking assembly. Such components are individually configured and correlated with respect to each other so as to attain the desired objective. First provided is a housing. The housing has a planar front first face and a planar rear second face essentially parallel with respect to each other. A peripheral wall is located therebetween. The peripheral wall has at least one linear extent. A slot is provided at an end thereof. A length of flexible, essentially inextensible tape is adapted to be rolled up in a spool-like configuration within the housing. The tape has a central axis of rotation extending perpendicularly through central extents of the front and rear faces. The tape also has an interior end located adjacent to the center of the spool. A free exterior end extends through the slot to exterior of the housing. A generally rigid L-shaped stopper is provided and functions to preclude the exterior end of the tape from entering the housing through the slot. The stopper is adapted to be grasped by a user for withdrawing an extent of tape from the housing for inserting the length of the tape into the housing. The tape is formed of a flexible material with an arcuate cross-sectional configuration of a width of between about ½ inches and 1½ inches, preferably about 1 inch. These sizes are illustrative only and a great latitude in the size could be utilized as long as the function is continued. The preferred material for the tape in conventional tape measures is metal, but other materials could be readily utilized as is appropriate. The radius of curvature of the tape is between about ¼ inch and 1 inch, preferably about ⅝ inch. A primary locking assembly includes interior components adapted to contact and restrain motion of the tape when contacted thereagainst. An exterior component external to the housing under the control of an operator functions to move the interior component into contact with the tape for locking material. The exterior component also functions to move the interior component out of contact with the tape to allow the withdrawal and insertion of tape with respect to the housing. A secondary locking assembly includes a fixed component operatively coupled with respect to the linear extent of the housing. The fixed component has a length of between about 1 inch and 4 inches, preferably about 3 inches. The fixed component has a width of between about ½ inch and 1½ inches, preferably about 1 inch. The radius of curvature of the fixed component is essentially equal to that of the tape. A movable friction component is provided and is positionable in operative proximity to the fixed component. The friction component is movable between an operative and storage position adjacent to the primary component and an inoperative position located remote from the primary component. The secondary locking component has a length and a width and an interior radius of curvature essentially equal to the primary fixed component. The side of the friction component remote from the radius of curvature is flat and essentially parallel with the linear extent of the housing. The secondary locking assembly also has a shiftable U-shaped connecting member with generally parallel resilient legs. The legs have exterior ends coupled to the edges of the movable component for guiding the motion thereof in a linear path toward and away from the fixed component. The connecting member has interior ends slidabley received in dove-tail slots formed in the housing along the first and second faces thereof perpendicular to the linear extent. An elongated projection is adapted to be received in an elongated recess to hold the movable component. In this manner the tape is held in a fixed position adjacent to the housing. In a second position, the movable component is remote from the housing to allow the insertion and movement of tape therebetween. In this manner a length of tape is withdrawn from the housing and bent thereover at essentially 180 degrees on the side of the housing adjacent to the secondary locking assembly and positioned between the components of the secondary locking assembly, an operator may conveniently hold the housing and tape in a fixed position for accurately determining measurements, including, in particular, heights. A belt clip is coupled to the first face. A rectangular cutout is formed in the leg adjacent to the clip.

In an alternate embodiment, the locking assembly has a shiftable L-shaped connecting member. An exterior end is coupled to an edge of the movable component for guiding the motion thereof in a linear path toward and away from the fixed component. The connecting member has interior ends slidabley received in a dove-tail slot formed in the housing along the rear face thereof perpendicular to the linear extent. An elongated projection is adapted to be received in an elongated recess to hold the tape in a fixed position adjacent to the housing. A second position remote from the housing allows the insertion of tape past a lateral opening therebetween. In this manner when a length of tape is withdrawn from the housing and bent thereover at 180 degrees on the side of the housing adjacent to the slot and positioned between the components of the second locking assembly, an operator may hold conveniently the housing and tape in a fixed position for accurately determining measurements, including, in particular, heights or other vertical dimensions or extensions.

In still another alternate embodiment, the locking assembly includes a fixed first component. The fixed first component is operatively coupled with respect to the linear extent of the housing having a length and a width, and a radius of curvature slightly greater than that of the tape. The secondary locking assembly also includes a second component fixedly positioned in operative proximity to the first component. The second component has a length and a width and a flat surface facing the radius of curvature of the first component. The secondary locking assembly also has a fixed connecting member. Ends are coupled to an edge of the first and second components to form a lateral opening therebetween.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tape measure system with primary and secondary locking assemblies which has all of the advantages of the prior art tape measures of known designs and configurations and none of the disadvantages.

It is another object of the present invention to provide a new and improved tape measure system with primary and secondary locking assemblies which may be easily and efficiently manufactured and marketed.

It is further object of the present invention to provide a new and improved tape measure system with primary and secondary locking assemblies which is of durable and reliable constructions.

An even further object of the present invention is to provide a new and improved tape measure system with primary and secondary locking assemblies which is susceptible of a low cost of manufacture with regard to both materials and labor, and which accordingly is then susceptible of low prices of sale to the consuming public, thereby making such tape measure system with primary and secondary locking assemblies economically available to the buying public.

Even still another object of the present invention is to provide a tape measure system with primary and secondary locking assemblies for facilitating the convenient and accurate use of a tape measure system when measuring, particularly heights.

A further object of the invention is to improve the utility of tape measures, particularly when the tape is extended and utilized in an approximately 180 degree folded configuration.

Lastly, it is an object of the present invention to provide a new and improved tape measure system with primary and secondary locking assemblies. A housing has a first face and a second face with a peripheral wall therebetween. A slot is provided in at least one linear extent on the peripheral wall. A length of flexible, essentially inextensible tape, is adapted to be rolled up in a spool-like configuration within the housing. The tape is formed of a flexible material with an arcuate cross-sectional configuration and has a central axis of rotation extending perpendicularly through central extents of the first and second faces, an interior end and a free exterior end extending through the slot to exterior of the housing, and a generally rigid stopper to preclude the exterior end of the tape from entering the housing. A locking assembly includes a first component operatively coupled with respect to the linear extent of the housing and a second component positionable in spaced operative proximity to the fixed component for the positioning of a portion of the tape therebetween. A connecting member couples at least one edge of the second component and one adjacent edge of the second component for allowing the frictional securing of a portion of the tape between the components.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the new and improved tape measure system constructed in accordance with the principles of the present invention.

FIG. 2 is a cross-sectional view taken along line 2—2 of FIG. 1.

FIG. 3 is a cross sectional view taken along line 3—3 of FIG. 1.

FIG. 4 is a perspective illustration of the U-shaped connecting member of the tape measure system shown in FIG. 1.

FIG. 5 is a perspective view of an alternate embodiment of the invention.

FIG. 6 is a top view of another alternate embodiment of the invention.

The same reference numerals refer to the same parts through the various Figures.

DESCRIPTION OF THE PREFERRED EMBODIMENT

With reference now to the drawings, and in particular to FIG. 1 thereof, the preferred embodiment of the new and improved tape measure system with primary and secondary locking assemblies embodying the principles and concepts of the present invention and generally designated by the reference numeral 10 will be described.

The present invention, the tape measure system with primary and secondary locking assemblies 10 is comprised of a plurality of components. Such components in their broadest context include a housing, a length of flexible, essentially inextensible tape, and a locking assembly. Such components are individually configured and correlated with respect to each other so as to attain the desired objective.

First provided is a housing 12. The housing has a planar front first face 14 and a planar rear second face 16 essentially parallel with respect to each other. A peripheral wall 18 is located therebetween. The peripheral wall has at least one linear extent 20. A slot 22 is provided at an end thereof.

A length of flexible, essentially inextensible tape 26 is adapted to be rolled up in a spool-like configuration within the housing. The tape has a central axis of rotation extending perpendicularly through central extents of the front and rear faces. The tape also has an interior end located adjacent to the center of the spool. A free exterior end 30 extends through the slot to exterior of the housing. A generally rigid L-shaped stopper 32 is provided and functions to preclude the exterior end of the tape from entering the housing through the slot. The stopper is adapted to be grasped by a user for withdrawing an extent of tape from the housing or for inserting the length of the tape into the housing. The tape is formed of a flexible material with an arcuate cross-sectional configuration of a width of between about ½ inches and 1½ inches, preferably about 1 inch. These sizes are illustrative only and a great latitude in the size could be utilized so long as the function is continued. The preferred material for the tape in conventional tape measures is metal, but other materials could be readily utilized as is appropriate. The radius of curvature of the tape is between about ¼ inch and 1 inch, preferably about ⅝ inch.

A primary locking assembly 36 includes interior components adapted to contact and restrain motion of the tape when contacted thereagainst. An exterior component 40 external to the housing under the control of an operator functions to move the interior component into contact with the tape for locking material. The exterior component also functions to move the interior component out of contact with the tape to allow the withdrawal and insertion of tape with respect to the housing.

A secondary locking assembly 42 includes a fixed component 44 operatively coupled with respect to the linear extent of the housing. The fixed component has a length of between about 1 inch and 4 inches, preferably about 3 inches. The fixed component has a width of between about ½ inch and 1½ inches, preferably about 1 inch. These sizes are illustrative only and a great latitude in the size could be utilized so long as the function is continued. The radius of curvature 43 of the fixed component is essentially equal to that of the tape. A movable friction component 45 is provided and is positionable in operative proximity to the fixed component. The friction component is movable between an operative and storage position adjacent to the primary component and an inoperative position located remote from the primary component. The secondary locking component has a length and a width and an interior radius of curvature 46 essentially equal to the primary fixed component. The side 47 of the friction component remote from the radius of curvature is flat and essentially parallel with the linear extent of the housing. The secondary locking assembly also has a shiftable U-shaped connecting member 48 with generally parallel resilient legs. The legs have exterior ends 50 coupled to the edges of the movable component for guiding the motion thereof in a linear path toward and away from the fixed component. The connecting member has interior ends 52 slidabley received in dove-tail slots 54 formed in the housing along the first and second faces thereof perpendicular to the linear extent. An elongated projection 56 is adapted to be received in an elongated recess 58 to hold the movable component. In this manner the tape is held in a fixed position adjacent to the housing. In a second position, the movable component is remote from the housing to allow the insertion and movement of tape therebetween. In this manner a length of tape is withdrawn from the housing and bent thereover at essentially 180 degrees on the side of the housing adjacent to the secondary locking assembly and positioned between the components of the secondary locking assembly, an operator may conveniently hold the housing and tape in a fixed position for accurately determining measurements, including, in particular, heights or other vertical dimensions or extensions.

A supplemental set of recesses 59 are formed in the housing to hold the projections 56 at an intermediate location of openness whereby the tape may be readily slid through the opening. In this manner the moveable friction component of the secondary locking assembly may be pulled fully away from the housing whereby the housing, when formed in two separable parts as is frequently utilized, may be taken apart for repair or reconstruction purposes.

A belt clip 62 is coupled to the first face. A rectangular cutout 64 is formed in the leg adjacent to the clip.

In an alternate embodiment, the locking assembly has a shiftable L-shaped connecting member 68. An exterior end is coupled to an edge of the movable component for guiding the motion thereof in a linear path toward and away from the fixed component. The connecting member has interior ends slidabley received in a dove-tail slot formed in the housing along the rear face thereof perpendicular to the linear extent. An elongated projection is adapted to be received in an elongated recess to hold the tape in a fixed position adjacent to the housing. A second position remote from the housing allows the insertion of tape past a lateral opening 70 therebetween. In this manner when a length of tape is withdrawn from the housing and bent thereover at 180 degrees on the side of the housing adjacent to the slot and positioned between the components of the second locking assembly, an operator may hold conveniently the housing and tape in a fixed position for accurately determining measurements, including, in particular, heights or other vertical dimensions or extensions.

In still another alternate embodiment, the locking assembly includes a fixed first component 74. The fixed first component is operatively coupled with respect to the linear extent of the housing having a length and a width, and a radius of curvature 76 slightly greater than that of the tape. The secondary locking assembly also includes a second component 78 fixedly positioned in operative proximity to the first component. The second component has a length and a width and a flat surface 80 facing the radius of curvature of the first component. The secondary locking assembly also has a fixed connecting member 82. Ends are coupled to an edge of the first and second components to form a lateral opening 84 therebetween.

The present invention has particular utility when used for measuring vertical extents during engineering operations since it allows the holding of a tape measure in a fixed position with one hand while moving it from location to location. Note is taken that the present invention is also capable of holding great lengths of flexible tape material from a tape measure in a horizontal orientation, in some instances up to 8 feet in length or longer with a central extent supported on the housing. When moving the device from one location to another while shooting a grade, it has been found that providing the second or moveable locking component of a contrasting color from the color of the tape upon which the numbers are placed makes it easier for a person viewing the device when shooting a grade to look for merely the top or one edge of the color, a predetermined height, rather than trying the read the numbers themselves. It should also be noted that the markings on the tape could be engineering markings or architectural markings, as for example, having the measurements in metric or inch/foot designations, or in fractional parts of the measurement such as the inch, or in tenths thereof.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tape measure system with primary and secondary locking assemblies to facilitate the convenient and accurate use when measuring, particularly heights, comprising, in combination:

a housing having a planar front first face and a planar rear second face essentially parallel with respect to each other and a peripheral wall therebetween, the peripheral wall having at least one linear extent with a slot at an end thereof;

a length of flexible, essentially inextensible tape adapted to be rolled up in a spool-like configuration within the housing having a central axis of rotation extending perpendicularly through central extents of the front and rear faces, the tape having an interior end located adjacent to the center of the spool and having a free exterior end extending through the slot to exterior of the housing with a generally rigid L-shaped stopper to preclude the exterior end of the tape from entering the housing through the slot, the stopper adapted to be grasped by a user for withdrawing an extent of tape from the housing for inserting the length of the tape into the housing, the tape being formed of a flexible metallic material with an arcuate cross-sectional configuration of a width of between about ½ inch and 1½ inches, preferably about 1 inch, and a radius of curvature of between about ¼ inch and 1 inch, preferably about ⅝ inch;

a primary locking assembly including interior components adapted to contact and restrain motion of the tape when contacted thereagainst and an exterior component external to the housing under the control of an operator to move the interior component into contact with the tape for locking material and out of contact with the tape to allow the withdrawal and insertion of tape with respect to the housing;

a secondary locking assembly including a fixed component operatively coupled with respect to the linear extent of the housing having a length of between about 1 inch and 4 inches, preferably about 3 inches, and a width of between about ½ inch and 1½ inches, preferably about 1 inch, and a radius of curvature essentially equal to that of the tape, the secondary locking assembly also including a movable friction component positionable in operative proximity to the fixed component and movable between an operative and storage position adjacent to the fixed component and an inoperative position located remote from the fixed component, the secondary locking assembly having a length and a width and an interior radius of curvature essentially equal to the fixed component, the side of the friction component remote from the radius of curvature being flat and essentially parallel with the linear extent of the housing, the secondary locking assembly also having a shiftable U-shaped connecting member with generally parallel resilient legs having exterior ends coupled to the edges of the movable component for guiding the motion thereof in a linear path toward and away from the fixed component, the connecting member having interior ends slidabley received in dove-tail slots formed in the housing along the first and second faces thereof perpendicular to the linear extent and with an elongated projection adapted to be received in an elongated recess to hold the movable component, and thus the tape in a fixed position adjacent to the housing and a second position with the movable component remote from the housing to allow the insertion and movement of tape therebetween whereby when a length of tape is withdrawn from the housing and bent thereover at essentially 180 degrees on the side of the housing adjacent to the secondary locking assembly and positioned between the components of the secondary locking assembly, an operator may conveniently hold the housing and tape in a fixed position for accurately determining measurements, including, in particular, heights; and a belt clip coupled to the first face with a rectangular cutout formed in the leg adjacent to the clip.

2. A tape measure system with a locking assembly comprising:

a housing having a first face and a second face and a peripheral wall therebetween, the housing having at least one linear extent on the peripheral wall with a slot at an end thereof;

a length of flexible, essentially inextensible tape adapted to be rolled up in a spool-like configuration within the housing having a central axis of rotation extending perpendicularly through central extents of the first and second faces, the tape having an interior end and having a free exterior end extending through the slot to the exterior of the housing with a generally rigid stopper to preclude the exterior end of the tape from entering the housing, the tape being formed of a flexible material with an arcuate cross-sectional configuration;

a locking assembly including a first component operatively coupled with respect to the linear extent of the housing, the locking assembly also including a second component positionable in spaced operative proximity to the first component, with a connecting member coupling at least one edge of the second component and one adjacent edge of the second component and with a portion of the tape located between the entire lengths of the first and second components for thereby frictionally securing a portion of the tape between the components.

3. The tape measure system as set forth in claim 2 wherein the first component of the locking assembly is a fixed component operatively coupled with respect to the linear extent of the housing having a length of between about 1 inch and 4 inches, preferably about 3 inches, and a width of between about ½ inch and 1½ inches, preferably about 1 inch, and a radius of curvature essentially equal to that of the tape and wherein the second component is a movable friction component positionable in operative proximity to the fixed component and movable between an operative position adjacent to the fixed component and an inoperative position located remote from the fixed component, locking assembly having a length and a width and an interior radius of curvature essentially equal to the fixed component, the side of the friction component remote from the radius of curvature being flat and essentially parallel with the linear extent of the housing, the locking assembly also having a shiftable U-shaped connecting member with generally parallel resilient legs having exterior ends coupled to the edges of the movable component for guiding the motion thereof in a linear path toward and away from the fixed component, the connecting member having interior ends slidabley received in dove-tail slots formed in the housing along the first and second faces thereof perpendicular to the linear extent and with an elongated projection adapted to be received in an elongated recess to hold the movable component, and thus the tape in a fixed position adjacent to the housing and a second position with the movable component remote from the housing to allow the insertion and movement of tape therebetween whereby when a length of tape is withdrawn from the housing and bent thereover at essentially 180 degrees on the side of the housing adjacent to the locking assembly and positioned between the components of the locking assembly, an operator may conveniently hold the housing and tape in a fixed position for accurately determining measurements, including, in particular, heights; and a belt clip coupled to the first face with a rectangular cutout formed in the leg adjacent to the clip.

4. The system as set forth in claim 2 wherein the first component of the locking assembly is a fixed component operatively coupled with respect to the linear extent of the housing having a length and a width, and a radius of curvature essentially equal to that of the tape, the locking assembly also including a movable friction component positionable in operative proximity to the fixed component and movable between an operative position adjacent to the fixed component and an inoperative position located remote from the fixed component, the locking assembly having a length and a width and a radius of curvature essentially equal to the fixed component and the tape, the side of the friction component remote from the radius of curvature being flat and essentially parallel with the linear extent of the housing, the locking assembly also having a shiftable L-shaped connecting member with an exterior end coupled to an edge of the movable component for guiding the motion thereof in a linear path toward and away from the fixed component, the connecting member having interior ends slidabley received in a dove-tail slot formed in the housing along the rear face thereof perpendicular to the linear extent and with an elongated projection adapted to be received in an elongated recess to hold the tape in a fixed position adjacent to the housing and a second position remote from the housing to allow the insertion of tape past a lateral opening therebetween whereby when a length of tape is withdrawn from the housing and bent thereover at 180 degrees on the side of the housing adjacent to the slot and positioned between the components of the second locking assembly, an operator may hold conveniently the housing and tape in a fixed position for accurately determining measurements, including, in particular, heights.

5. The system as set forth in claim 2 wherein the first component of the locking assembly is a fixed component operatively coupled with respect to the linear extent of the housing having a length and a width, and a radius of curvature slightly greater than that of the tape and wherein the second component is fixedly positioned in operative proximity to the first component, the second component having a length and a width and a flat surface facing the radius of curvature of the first component, the locking assembly also having a fixed connecting member with ends coupled to an edge of the first and second components to form a lateral opening therebetween.

* * * * *